United States Patent
Barker et al.

(12) 
(10) Patent No.: US 6,870,811 B2
(45) Date of Patent: Mar. 22, 2005

(54) QUALITY OF SERVICE FUNCTIONS IMPLEMENTED IN INPUT INTERFACE CIRCUIT INTERFACE DEVICES IN COMPUTER NETWORK HARDWARE

(75) Inventors: Kenneth James Barker, Cary, NC (US); Gordon Taylor Davis, Chapel Hill, NC (US); Clark Debs Jeffries, Durham, NC (US); Mark Anthony Rinaldi, Durham, NC (US); Kartik Sudeep, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 09/764,954

(22) Filed: Jan. 18, 2001

(65) Prior Publication Data

US 2002/0131365 A1 Sep. 19, 2002

(51) Int. Cl.[7] .............................................. H04L 12/28
(52) U.S. Cl. ........................ 370/235; 370/253; 370/429
(58) Field of Search ................................ 370/235, 252, 370/253, 409, 392, 429

(56) References Cited

U.S. PATENT DOCUMENTS

| | | | | |
|---|---|---|---|---|
| 5,268,900 A | * | 12/1993 | Hluchyj et al. | ............. 370/429 |
| 5,638,359 A | | 6/1997 | Peltola et al. | |
| 6,041,038 A | | 3/2000 | Aimoto | ....................... 370/229 |
| 6,424,624 B1 | * | 7/2002 | Galand et al. | ............... 370/253 |
| 6,657,960 B1 | * | 12/2003 | Jeffries et al. | ............... 370/253 |
| 6,657,962 B1 | * | 12/2003 | Barri et al. | .................. 370/235 |

FOREIGN PATENT DOCUMENTS

WO 01/05107 A1 1/2001 ........... H04L/12/56

OTHER PUBLICATIONS

U.S. Appl. No. 09/448,197, Jeffries et al., filed Nov. 23, 1999.
"Method and System For Providing Differentiated Services In Commputer Networks".
U.S. Appl. No. 09/540,428, Jeffries et al., filed Mar. 31, 2000.
"Method and System For Controlling Flows in Sub-Pipes of Computer Networks".

* cited by examiner

Primary Examiner—Salvatore Cangialosi
(74) Attorney, Agent, or Firm—Joscelyn G. Cockburn

(57) ABSTRACT

The decision to discard or forward a packet is made by a flow control mechanism, upstream from the forwarding engine in the node of a communication network. The forwarding engine includes a switch with mechanism to detect congestion in the switch and return a binary signal B indicating congestion or no congestion. The flow control mechanism uses B and other network related information to generate a probability transmission table against which received packets are tested to determine proactively whether a packet is to be discarded or forwarded.

29 Claims, 14 Drawing Sheets

IIC

Update transmit probability table

Timer awakens program with period Dt

Fetch B, E values from registers

Update E and store

For i = 1,..., N fetch fi, Ci, Di, Ti values from registers

For i = 1,..., N update Ti and store in table of Ti values

Figure 11

BAT flow control refreshes transmit fractions Ti for pipes in a table.

Timer with period Dt awakens BAT flow control.

New transmit fractions computed per pipe.

Results stored in a table.

| pipe number i | Transmit fraction Ti |
|---|---|
| | |

QUALITY OF SERVICE FUNCTIONS IMPLEMENTED IN INPUT INTERFACE CIRCUIT INTERFACE DEVICES IN COMPUTER NETWORK HARDWARE

CROSS-REFERENCE TO RELATED PATENT APPLICATIONS

This application is related to, and contains common disclosure with, co-pending and commonly assigned patent applications:

"Method and System for Providing Differentiated Services in Computer Networks," Ser. No. 09/448,197, filed Nov. 23, 1999 now U.S. Pat. No. 6,657,960;

"Method and System for Controlling Flows in Sub-Pipes of Computer Networks", Ser. No. 09/540,428, filed Mar. 31, 2000.

Each co-pending patent application is hereby incorporated by reference into this description as fully as if here represented in full.

BACKGROUND OF THE INVENTION

1. Technical Field

The present invention relates to congestion management in computer networks in general and, in particular, to flow control by network hardware.

2. Prior Art

A switch is a network node that directs datagrams on the basis of Medium Access Control (MAC) addresses, that is, Layer 2 in the OSI model well known to those skilled in the art [see "The Basics Book of OSI and Network Management" by Motorola Codex from Addison-Wesley Publishing Company, Inc., 1993]. A switch can also be thought of as a multiport bridge, a bridge being a device that connects two LAN segments together and forwards packets on the basis of Layer 2 data. A router is a network node that directs datagrams on the basis of finding the longest prefix in a routing table of prefixes that matches the Internet Protocol (IP) destination addresses of a datagram, all within Layer 3 in the OSI model. The present invention considers a network node to be a switch, a router, or, more generally, a machine capable of both switching and routing functions, sometimes called a switch/router. For the purpose of brevity, the term "switch" in the present document will be use to cover all three logical types of network nodes: switch, router, or switch/router, or even more generally, any machine that processes datagrams that arrive unpredictably and must be momentarily stored and then forwarded or discarded on the basis of destination and value information in one or more headers.

Any switch has finite storage capacity for use in storing datagrams awaiting traffic direction decisions. During episodes of congestion, some traffic of high volume and low value may be purposefully discarded so that storage will not become overwhelmed, causing the loss of incoming datagrams without regard to their value. Thus the purpose of intelligent flow control is to note the behavior of flows of different classes relative to their service-level contracts, to discard abundant, low-value packets in accordance with value policies when necessary, and so to insure that valuable datagrams that conform to their contract rates can be correctly processed.

The use of flow control to manage congestion in communications networks is well known in the prior art. In a conventional computer system the flow control might be to simply discard datagrams when a queue reaches a certain level of occupancy, a policy known as taildrop. A more advanced system might discard datagrams randomly with the probability of discard periodically updated in response to queue occupancy. That is, the fraction of datagrams transmitted (equal to 1 minus the fraction discarded) might be 1 when queue occupancy is below a certain low threshold and 0 when queue occupancy is above a certain high threshold. Between the thresholds, queue occupancy might determine a linearly decreasing transmit probability. Such flow control is known as Random Early Detection (RED). If different low and high thresholds are used for datagrams with different classes of service but sharing the same queue, then the flow control is known as Weighted Random Early Detection (WRED). Such intuitive methods require tuning of the thresholds as offered loads change, a major disadvantage to their use in Quality of Service (QoS) installations.

Another drawback with the prior art techniques is that the decision to discard a packet is made in the switch and/or after some type of processing is already performed on the packet. Partially processing a packet and then discarding it results in unnecessary waste of bandwidth.

In view of the above, more efficient apparatus and methods are required to make discard/transmit decisions in high speed networks.

SUMMARY OF THE INVENTION

The present invention describes a system and method for making intelligent, high-speed transmit/discard decisions.

A distinguishing characteristic of the present invention is that the transmit/discard decision is made upstream of routine switch functions. Therefore, the present invention prevents or reduces switch congestion by proactively discarding datagrams that would not survive processing through a switch anyway. The present invention thereby releases computing and storage resources for processing the more valuable types of traffic when congestion of finite resources makes processing of all datagrams impossible.

Another distinguishing characteristic of the present invention is that a signal called excess bandwidth signal B=0 or 1 is not determined by the behavior of one resource in a switch, but rather is in a preferred embodiment defined as a regular expression of AND, OR, and NOT operations of various signals. Specifically, the upstream site of flow control is an Input Interface Circuit (IIC), as defined below. Each IIC makes transmit/discard decisions on the frames in a certain set of pipes. A pipe consists of an edge-to-edge path through a network and a logical aggregation of some datagrams that use that path. To each IIC is associated a set of pipes, the pipes that pass through the IIC. In the present invention, the value of B is determined by the states of all the resources in the switch fed by the IIC that are used by the pipes of that IIC. Some such resources would be in general shared by other pipes belonging to other IICs on the same switch. At any rate, B is a regular expression of the states of plurality of resources that is periodically reported to and used by flow control in the IIC.

A key foundation of the present invention is use of control theory, in place of intuitive methods, as disclosed in "Method and System for Controlling Flows in Sub-Pipes of Computer Networks", Ser. No. 09/540,428, filed Mar. 31, 2000. Within this docket, control theory is embodied in a type of flow control called Bandwidth Allocation Technology (BAT), which is characterized by the following five Properties A, B, C, D, E. The Properties are now explained for the present invention:

Property A. BAT uses an Excess Bandwidth Signal B=0 or 1 that summarizes the condition of a switch insofar as the pipes that are aggregated in one IIC are concerned. B is computed every time flow control transmit probabilities are computed. If B is consistently 1, then all pipes may be 100% transmitted without causing congestion in switch resources that would compromise performance parameters contained in Service Level Agreements (SLAs). If B is consistently 0, then transmit fractions for all pipes with at least some best effort traffic will be reduced until each pipe carries at least its guaranteed bandwidth but possibly no more. B can be defined in terms of a combination of signals from queue values relative to thresholds (so B=1 if a queue is below a threshold, else B=0). Alternatively B might be defined in terms of the rate of change of a queue level (so B=1 if a queue is decreasing or very low, else B=0). As another alternative, B could be defined by comparing a flow rate to a flow rate threshold. The precise construction of B is not critical to the present invention. Only the above implications for all 1 or all 0 values of B are critical.

Property B. BAT further computes the exponentially weighted average E of excess bandwidth signal values B. In a preferred embodiment, the value of E at time t+Dt is computed by $$E(t+Dt)=(1-W)*E(t)+W*B(t)$$

where E(t) is the value of E at time t and B(t) is the value of B at time t. As is well known to those skilled in the art, the weight in this equation is W. In a preferred embodiment the value of W is 1/32. Other values such as 1/16 or 1/64 might be used as equally suitable. The critical aspect is that E is some reasonable smoothing of B signals.

Property C. BAT examines each pipe and if the bandwidth in the pipe is below its minimum guaranteed rate (called herein its min), then after at most a few iterations, it is automatically 100% transmitted by BAT.

Property D. BAT further examines each pipe and if the bandwidth in the pipe is above its maximum upper limit (called herein its max), then after at most a few iteration, the transmit fraction is reduced until the amount transmitted by BAT is at or below the max.

Property E. BAT further examines each pipe not already at or below its min rate or above its max rate and uses B as follows. If B=1, then the transmit fraction Ti(t+Dt) at time t+Dt for pipe i is $$T(t+Dt)=T(t)+Ci*E(t)*Ti(t)$$

where Ci is a constant determined at initialization by methods described below. Furthermore, if B=0, then the transmit fraction Ti(t+Dt) at time t+Dt for pipe i is $$T(t+Dt)=T(t)-Di*fi(t)$$

where Di is a constant determined at initialization by methods described below and fi(t) is the flow rate of transmitted traffic in pipe i at time t during the last epoch of flow control.

In Properties B and E and throughout the remainder, the symbol * designates multiplication.

In a preferred embodiment, the present invention provides for flow control based upon the concepts of control theory to be implemented and enforced in the MAC (Ethernet) or Framer (Packet over Sonet) data flow components of a switch. In an alternative embodiment, the present invention also includes flow control based upon the concepts of control theory to be implemented and enforced in the Physical Layer Interface (PHY) of a switch. In any case, the flow control mechanism is integrated into an Input Interface Circuit (IIC) prior to data entering the main packet classification and forwarding functions of the switch. In this way, by providing flow control upstream of ordinary switch functions, the present invention differs fundamentally from the above co-pending patent applications and prior art.

Furthermore, the present invention uses an excess bandwidth signal from the switch to the IIC that indicates congestion precisely for the switch resources used by the pipes associated with the IIC. Congestion in switch resources not used by the pipes in the IIC is not reported to the IIC. In this way the present invention also differs fundamentally from the above co-pending patent applications.

Yet another aspect of the excess bandwidth signal that specifically relates to the present invention is the combination of multiple excess bandwidth indications, each relating to different output ports, into a single physical signal, possibly a Time Division Multiplex (TDM) signal, enabling flow control actions to be focused on those output ports experiencing congestion.

In a preferred embodiment, the present invention further focuses on the input from a network link into a switch. After a datagram enters an Input Interface Circuit (IIC) and is converted by use of well known prior art techniques into digital data, there is an opportunity exploited by the present invention to test just the first part of the datagram for its membership in one or another class of service (herein called a pipe). After determination of pipe membership, which might be membership in a premium Assured Forwarding pipe with a positive guaranteed bandwidth value or in a Best Effort pipe with no such guarantee, the corresponding value of a transmit probability is selected from a table. The table itself is periodically refreshed in response to flow rates in the pipes sharing the IIC and in response to a binary congestion signal to that IIC from the switch. The table is further constructed in light of certain constants per pipe that are declared at initialization on the basis of global pipe paths and bandwidth contract values. Then the transmit probability is compared to the current state of a high speed random number generator and the result of the comparison is used to decide by the IIC whether to transmit the entire arriving datagram into the switch for conventional processing and routing or to discard the entire arriving datagram without sending it to the switch.

For the purpose of this description, the generic term IIC is intended to cover any of various low layer functions, including but not limited to a PHY, a Media Access Control (MAC) for Ethernet systems, or a Framer (in Packet over Sonet systems). Those skilled in the art will readily recognize the logical parallels since all such devices are conduits of datagrams into a switch and so all such devices could be sites of proactive flow control with the same benefits to switch function as herein described in general terms for IICs.

These and other concepts are to be described in detail in the following.

In particular, Datagrams enter a switch as photonic or analog signals that are converted to digital data of a form usable by a switch or router in the input section of a Physical Layer Interface (PHY). The PHY also includes complementary functions for the output part of the port. The digital data is subsequently partitioned into individual datagrams or packets by the input section of a Framer or MAC according to the format of the originally transmitted data. The Framer or MAC also includes complementary functions for data flowing in the opposite direction. The focus of the present invention is enabling a flow control mechanism such as Bandwidth Allocation Technology (BAT) within the input section of the PHY, Framer, or MAC, hereinafter referred to collectively as Input Interface Circuits (IIC). BAT is a type of flow control based upon control theory, and represents a preferred approach to flow control, although other specific flow control algorithms may be applied within Input Interface Circuits by those skilled in the art without departing from the scope of the present invention. A complete algorithmic description of BAT appears below.

Switches in a network [see FIG. 1] pass datagrams with well known structures [see FIG. 2]. Switches are connected by optical fiber or copper wire through PHYs [see FIGS. 3, 4]. The flow control mechanism of the present invention extracts header information that correlates each datagram to a specific aggregate flow or pipe. The information might be the Differentiated Services Code Point [described in IETF RFC Reference RFC 2474 Definition of the Differentiated Services Field (DS Field) in the IPv4 and IPv6 Headers. K. Nichols, S. Blake, F. Baker, D. Black. December 1998. (Format: TXT=50576 bytes) (Obsoletes RFC1455, RFC1349) (Status: PROPOSED STANDARD) incorporated herein by reference] in the Type of Service byte [see FIG. 2]. The information is used to select a transmit probability value from a table [see FIG. 12] and that value is compared to a random number to make the decision. Also at data flow rate, bytes transmitted in each pipe are counted to provided input to the BAT calculation of transmit probabilities.

Such a design for implementing flow control is largely independent of the switch design, provided the switch can communicate congestion information to the IIC in a certain manner. Only the simplest signal from the switch to each IIC is required, a current binary value reflecting the congestion state of shared resources in the switch that are used by the pipes in the given IIC and possibly at the same time by other pipes [see FIGS. 6, 7]. Enhanced functionality may be achieved by providing multiple congestion indications, that is, one per output blade, either separately or mixed into a common signal.

There are four logical tasks of the enhanced Flow Control function in the IIC proceeding at three markedly different speeds. At low rate, the invention updates administrative information provided at initialization [see FIG. 8] on the coordinates and characteristics of aggregate flows (herein called pipes). At moderate rate, the device then uses congestion signals in the BAT flow control algorithm to compute transmit probabilities per pipe. The transmit probabilities are in part derived from congestion signals from the switch, also at moderate rate [see FIG. 9]. Furthermore, counters at data flow rate must record per pipe flows. Also at data flow rate, the Flow Control device probabilistically transmits or discards data packets prior to entering the switch or router in accordance with the transmit probabilities [see Table 1 and FIGS. 10, 11, 12, 13]. Only the last function, probabilistic transmit or discard decisions, must reside in the IIC. The other functions could be moved to a Flow Information Organization function residing in the switch itself.

BRIEF DESCRIPTION OF THE DRAWINGS

FIG. 11 shows details of Ti calculations to refresh the transmit probability table in each IIC.

FIG. 12 shows transmit probability table calculation and structure.

DETAILED DESCRIPTION OF INVENTION

Figure 1:
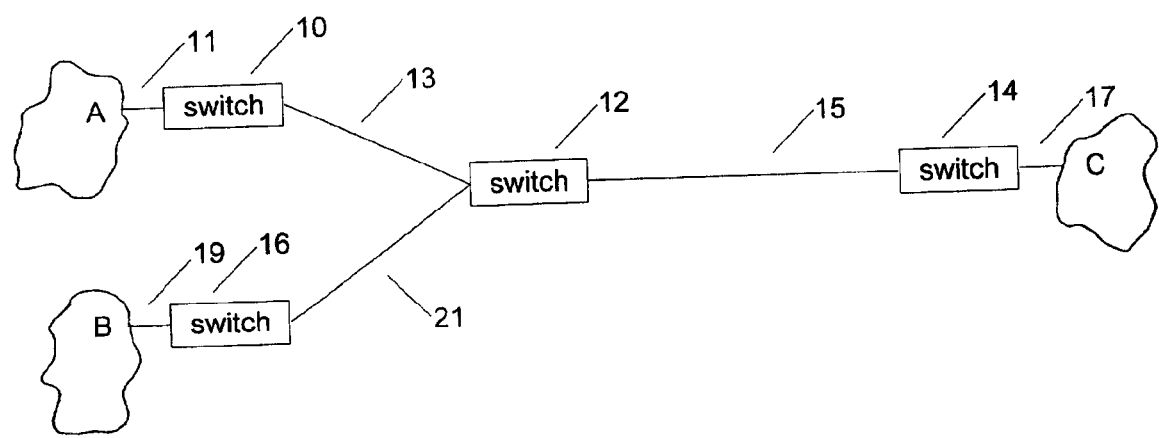
FIG. 1 illustrates a computer network connecting Local Area Networks A, B, C.

FIG. 1 shows an abstraction of a computer network including Local Area Networks (LANs) A, B, C. These LANs may include workstations, servers, storage devices, or other computers that exchange information in a network. The network may also include an infrastructure of switches 10, 12, 14, 16, as well as communications links 11, 13, 15, 17, 19, 21 between pairs of switches or between LANs and switches. Thus a computer network is organized as a graph with vertices (computers and switches) and edges (communications links). In general terms, the purpose of the invention described herein is to promote movement of data within the computer network efficiently and fairly, taking into account certain contracts pertaining to the availability and quality of service, the contracts being held by consumers of computer network services.

a) Quality of Service

The overall goal, according to the present invention, of moving flow control upstream of the switch is to more closely approximate a kind of ideal flow control for Quality of Service (QoS). During episodes of congestion, the flow control mechanism will discard intelligently some incoming traffic, namely, the datagrams that due to congestion, would not make it through the switch anyway. This increases efficiency on classification and routing mechanisms in the switch since processing and packet storage capacity are not wasted on packets that must eventually be discarded. This process simply discards those packets sooner rather than later.

QoS in the present invention is defined in terms of logical pipes. All traffic is assumed to be in some QoS aggregate flow class or pipe. Also, it is assumed that not all traffic is Best Effort. The correct allocation of bandwidth is to be determined by the Max-Min Algorithm, as explained below.

The path of each pipe through a switch comprises the coordinates of its source port, path through switch, and target port. Such a path is actually a piece of the path of the pipe through a network from "edge-to-edge," where the term edge might mean an individual workstation, a server, an autonomous system, or other computer network source entity. As explained below, certain coefficients for linearly increasing flows during periods of excess bandwidth and exponentially decreasing flows otherwise are determined at initialization from global knowledge of all resources and Service Level Agreements (SLAs). The function of flow control is use of these coefficients to discard packets intelligently and as required by congestion conditions.

The effect of using flow control upstream of the switch and associated administrative mechanisms of network management is an efficient implementation of strong QoS with quantitative bandwidth performance guarantees edge-to-edge.

b) Bandwidth Allocation Technology (BAT)

The processing capability of the switch (with a given complement of filter rules, routing tables, or other lookup mechanisms) is assumed to be known. This knowledge leads to the concept of an excess bandwidth signal B=1 or 0 for each IIC. This signal is defined to be 1 if all the pipes passing through a given IIC and into the switch are currently passing through mechanisms in the switch causing zero discards, acceptable latency, and acceptable jitter. Thus B could be defined by some combination of ANDs or ORs or NOTs of queue occupancy comparisons with thresholds, by comparing processing rates in bits per second with thresholds, or by a combination of queue threshold and flow rate threshold comparisons. The precise definition of B is not critical. Rather, B is required to exhibit only two behaviors. Namely, if, to repeat, the B value communicated from the switch to the IIC is consistently 1, then the system is serving all the pipes in the IIC at acceptable levels. If B is always 0, then there are some drops in some pipes, or some latency or jitter statistics are unacceptable. The eventual consequence of consistent B=1 signals is that all the pipes in the IIC are 100% transmitted. The eventual consequence of consistent B=0 signals is that all the pipes in the IIC are transmitted at fractions sufficiently large to met all their guaranteed minimum bandwidth rates (mins), but possibly not more.

An additional, fundamental assumption is that SLAs (Service Level Agreements) are sold so that if all pipes at all times have constant offered loads less than or equal to their guaranteed minimum (min) values, then all excess bandwidth signals are always 1. At such offered loads, all SLAs of all pipes using the IIC are honored by the switch, and all B signals are 1.

In one embodiment, several B signals could be multiplexed by means of a Time Division Multiplex (TDM) system for efficient communication of congestion information. Each B signal might then represent congestion (or absence of congestion) in a particular output blade or port. Then within a particular IIC, flow control could be applied independently on groups of pipes sharing a common output blade or port. Advantageously, discard actions would be focused only on pipes destined for congested output blades or ports, while even Best Effort traffic destined for noncongested blades or ports would be passed into the switch without discards.

c) Input Interface Circuit (IIC)

Figure 2:
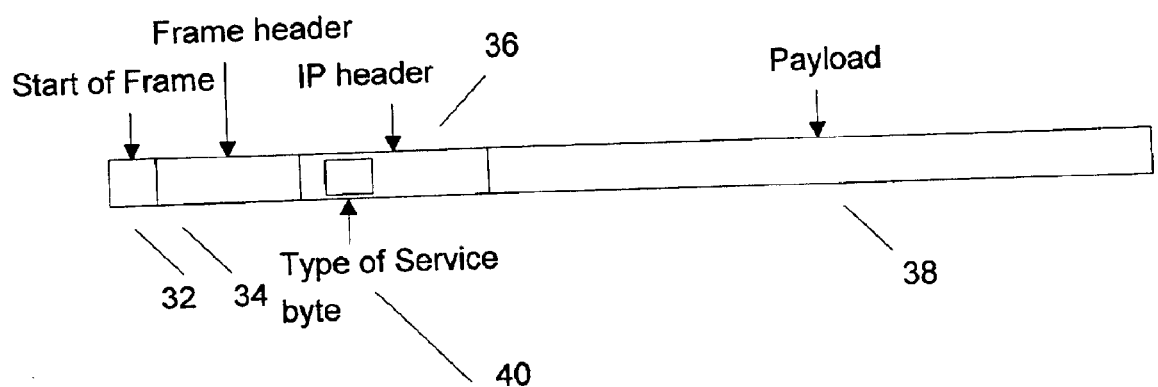
FIG. 2 shows a schematic of headers and payload of a representative datagram.
Figure 3:
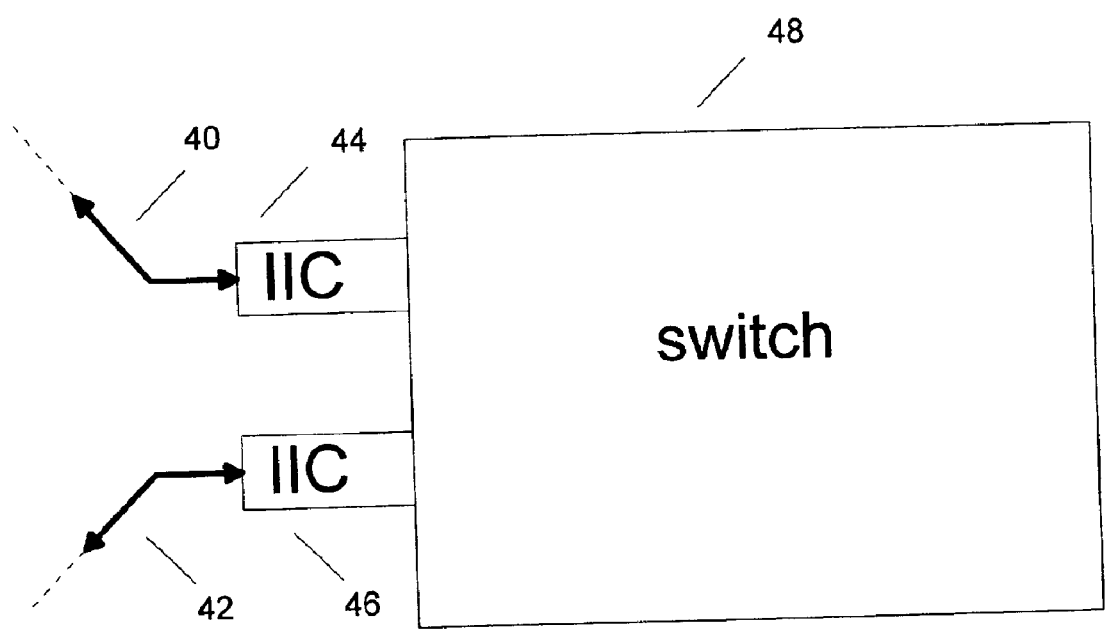
FIG. 3 shows the flow of data to and from a switch through Input Interface Circuits IICs).
Figure 4:
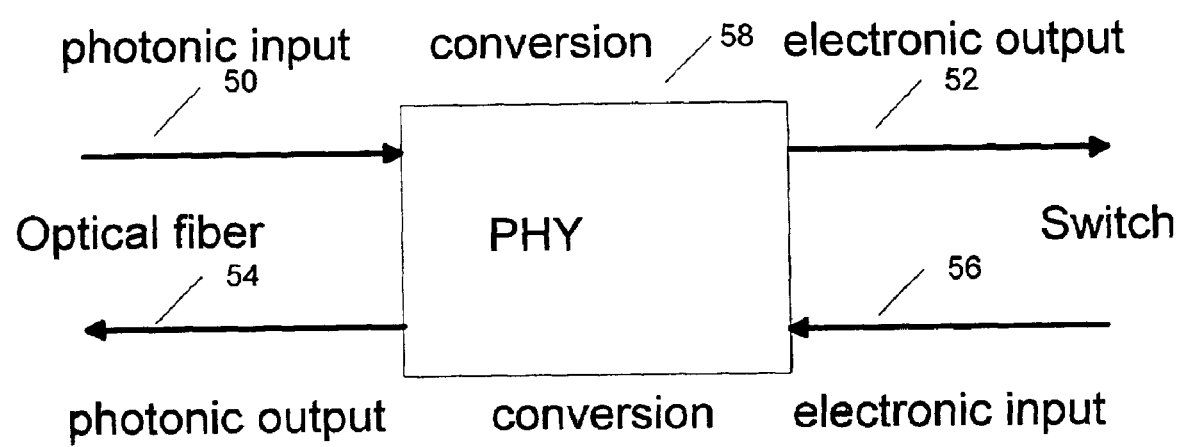
FIG. 4 illustrates photonic-electronic conversion of data flows between optical fiber and switch that takes place in Physical Interface circuits (PHYs).

The context of this section is shown in FIGS. 2, 3, and 4.

As is well known to those skilled in the art, computer networks transmit data in the form of datagrams with a structure consisting of a header and a payload. The payload (or "data") itself may be comprised of headers of different organizational levels, for example, Ethernet (Link Layer), IP (Network Layer), TCP (Transport Layer).

In the important case of Ethernet, the frame format is established by the Standard ISO/IEC 8802–3: (1996E), ANSI/IEEE Std. 802.3, 1996 Edition. The format is <inter-frame><peamble><sfd><eh><data><fcs> where inter-frame is a gap between datagrams, preamble is a coded sequence of bits designating that a frame is about to arrive, sfd is start of frame delimiter, eh is Ethernet header, data is the Ethernet payload that might consist of an IP datagram with IP header and data, and fcs is frame check sequence. In detail, the preamble is at lease seven (7) bytes of "10101010." The sfd byte is "10101011." IP accepts "packets" from the Layer 4 transport protocol (TCP or UDP), adds its own header to it and delivers a "datagram" to the Layer 2 data link protocol. It may also break the packet into fragments to support the maximum transmission unit (MTU) of the network, each fragment becoming an Ethernet frame.

FIG. 2 depicts in some detail the organization of datagrams needed for the present invention. A datagram 30 is a set of bits. In IP version 4 (IPv4), the IP header must contain at least 160 bits, number 0, 1, 2, . . . . The eight bits numbered 8, 9, . . . , 15 constitute the Type of Service byte, and in particular the DiffServ Code Point consists of the six bits number 8, 9, . . . , 13 (the other two are reserved for future standardization). The discussion herein pertains to IPv4 but those skilled in the art will recognize that the invention could be expressed just as well in IP version 6 or any other system in which structured datagram headers have QoS information.

As represented schematically in FIG. 2, the frame header has a start of frame segment 32 and a frame header 34. Behind the frame header in time is the IP structure with IP header 36 and data payload 38. Within the IP header 36 is the Type of Service byte 40. The Type of Service byte contains 6 bits that can be used to differentiate classes of service. Clearly one method for organizing QoS in a network would be to use consistent labels as the six class of service bits in every datagram's Type of Service byte. For example, all Best Effort datagrams might be labeled with six 0 bits. Many other methods and schemes have been proposed and are known by those skilled in the art.

In one embodiment of the present invention, the switch is connected to the network via Ethernet links. A link is rated at some number of bits per second, so a time increment in the link is equivalent to bits or bytes. Let b denote a measurement in bits and B denote a measurement in bytes. The gap between Ethernet frames is 12 B with no signal plus 1 B start of frame delimiter plus 7 B of preamble. Thus the inter frame gap is 20 B. A frame itself may be from 64 B to 1518 B. The Differentiated Services Code Point (DSCP) is a set of 6 b in the Type of Service byte in the IP header.

In FIG. 3, the logical positioning of Input Interface Circuits (IICs) is shown. Datagrams enter and exit a switch through links 40, 42. Links are connected logically and physically to the data processing functions of the switch 48 through IICs 44 and 46. For purposes of the present invention, an IIC can be a Physical Layer interface (PHY) that converts between photonic signals in an optical fiber and electronic signals in a wire. Or, an IIC can be an electronic device that recognizes frame structures (header, components of header) such as a medium Access Control (MAC) circuit in Ethernet technology or a Framer circuit in Packet over Sonet technology.

In operation, the PHY looks for the start of a frame, then the preamble of the frame. In FIG. 4, photonic input 50 arrives on a link at a PHY. The PHY 58 converts photonic signals (bits) into electronic signals (bits). The electronic signals pass from the PHY to the switch in a wire 52. Data leave the switch in electronic form in a wire 56. The data are converted to photonic signals in the PHY and then depart the PHY in an optical fiber 54 in the link. The link is therefore a full duplex (bidirectional) datagram conduit.

As Ethernet frames arrive, the PHY sends a Receive Data Valid (R_DV) signal to the Media Access Control (MAC). Between frames the PHY sends an idle signal to the MAC. In the case that the present invention is implemented in the PHY, Some storage is needed in the PHY to get to the DiffServ Code Point (DSCP) to identify the logical pipe in which the frame flows. In one embodiment, the PHY must store the 8 B preamble and an additional 14 B to include the IP header (FIG. 2) from which the DSCP can be read. Those skilled in the art understand that variations of Ethernet type will lead to alternative embodiments in which the DCSP is positioned elsewhere. The present invention includes the this possibility by including the practices of determining Ethernet type and so reading the DSCP from the appropriate bit positions.

If the present invention in practiced in the MAC or Framer, then the very same policies apply to store a relatively small number of bits in the beginning of an Ethernet frame and to read from appropriate bit positions the DSCP.

As it is read, the DSCP (6 bits) is mapped to one of N<=64 transmit probabilities (N=number of classes of pipes entering the switch through the given PHY and passing to the given MAC). Packets that arrive from different sources with the same DSCP are treated in aggregation. For each aggregation, a transmit probability is computed by flow control. Frames in each aggregation or pipe are transmitted or discarded. The decision is made either in the PHY or the MAC (or Framer in Packet over Sonet). Generically, the decision is made in the IIC. A transmit probability with a value in [0, 1] is compared to the current value of a random number in [0,1]. If the transmit probability is >=the random number, then the frame is transmitted. Else it is dropped, meaning that IIC logic erases the bits already stored plus all the subsequently arriving bits of the same frame.

Figure 5:
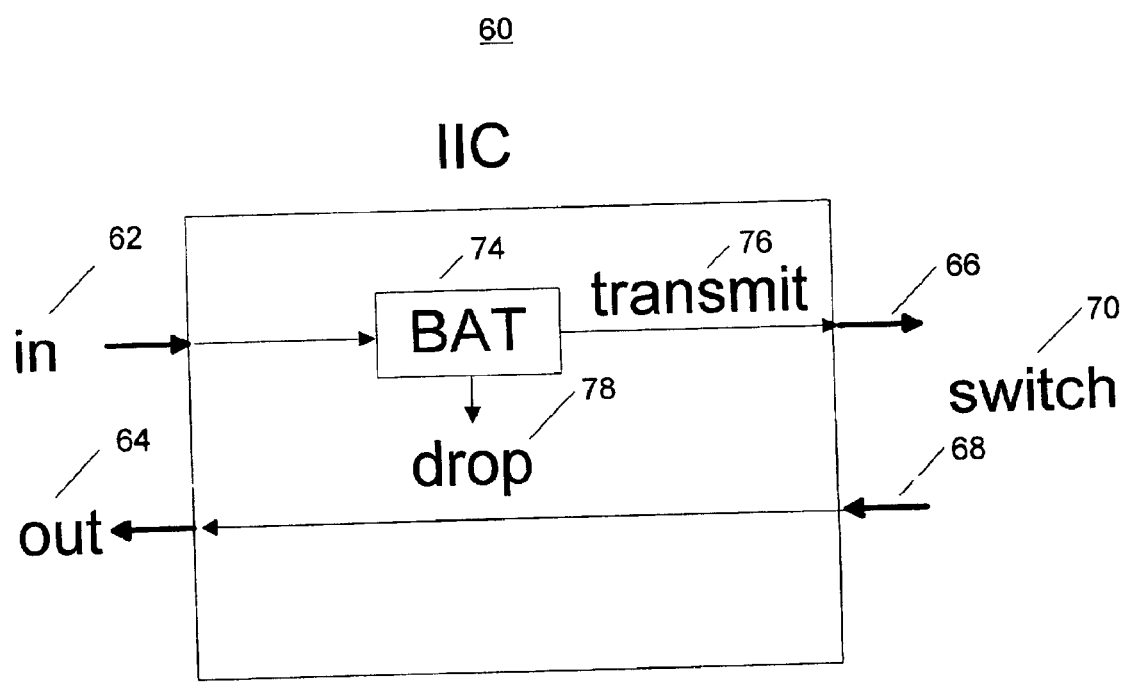
FIG. 5 shows the entrance of datagrams into an IIC and a decision made by BAT flow control in the IIC to transmit or discard the frame.

The logical arrangement of these IIC functions is shown in FIG. 5. The IIC 60 receives datagrams from input 62. The datagrams pass into the IIC and a minimal number of bits in the header are stored and analyzed by Bandwidth Allocation Technology (BAT) flow control 74. Each datagram might be dropped 78 or transmitted 76. Transmitted datagrams then pass through a wire 66 into a switch 70 for classification, metering, and routing. Datagrams departing the switch from wire 68 also enter the IIC. The PHY in the data stream converts electronic to photonic signals that then pass into a link 64.

Figure 6:
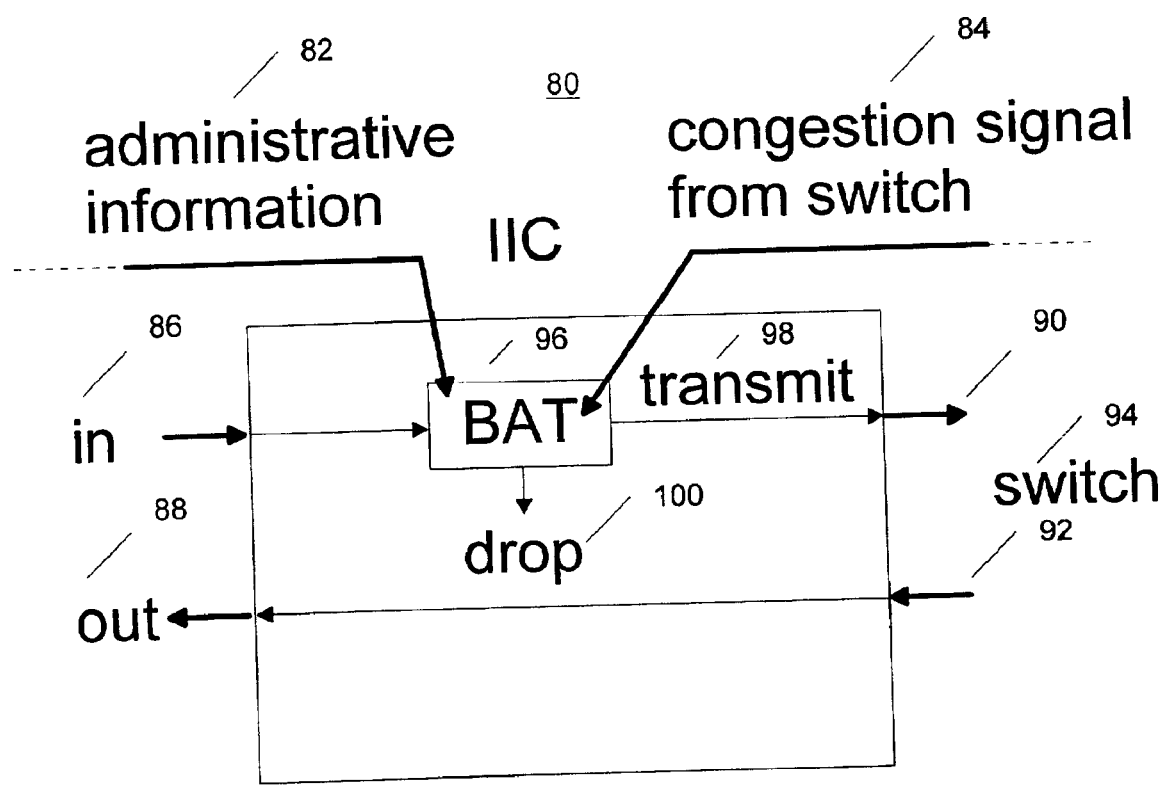
FIG. 6 shows the different time scales used in the three levels of Bandwidth Allocation Technology (BAT) flow control.

Further details of flow control in an IIC are depicted in FIG. 6. An IIC 80 utilizes administrative information 82 (reflecting the paths of the pipes in the network well as the bandwidth guarantees of the pipes). An ICC also uses frequent values of a congestion signal from the switch 84. This information is used in an implementation of BAT 96 in the IIC. A datagram enters the IIC in an input 86 and BAT flow control decides to drop the datagram 100 or transmit the datagram 98. If transmitted, the datagram flows into the switch 94 in a wire 90. Datagrarns depart the switch in a wire 92 that, if the IIC is a PHY, are converted into photonic form. In any event, the IIC endows departing datagrams with appropriate timing structure so they may be sent to the next computer network node through link 88.

In the case that the IIC is the PHY, the present invention could make use of the standards for PHYs. Standards include a maintenance interface with the switch, for example a 100 kHz wired signal. A control point acting from within the switch or through the switch can communicate with each PHY using this maintenance interface. This existing connection could be used for either initialization information for the pipes in a PHY or for updates on congestion from the switch to the PHY. Alternatively, an additional interface could be specifically designed to access flow control functions. In addition, the PHY could provide encoding, decoding, clocking and synchronization functions.

As noted above, those skilled in the art will readily appreciate that the same logical flow control functions for pipes might be performed in the MAC (for Ethernet) or Framer (for Packet over Sonet) or other IIC. In all cases, certain logical pipes are naturally organized by the PHY, MAC, or Framer resource they share to enter the switch. Furthermore, other headers such as the MPLS header with label and experimental bits might be used in place of the DSCP to assign packets to pipes. As such, the present invention could be practiced in other forms to provide the above benefits in terms of proactive discarding of datagrams that would otherwise be discarded in the switch. The goal of such proactive transmit/discard decisions would be the same: avoid inevitable discards after inefficiently consuming valuable processing and storage resources in the switch by enabling flow control in a connecting device upstream of the switch itself.

d) Excess Bandwidth Signal B and the Max-Min Algorithm

An excess bandwidth signal B=0, 1 must be defined as follows for use by the IICs. This will be done in the context of the Max-Min Bandwidth Allocation Algorithm, also explained below.

Figure 7:
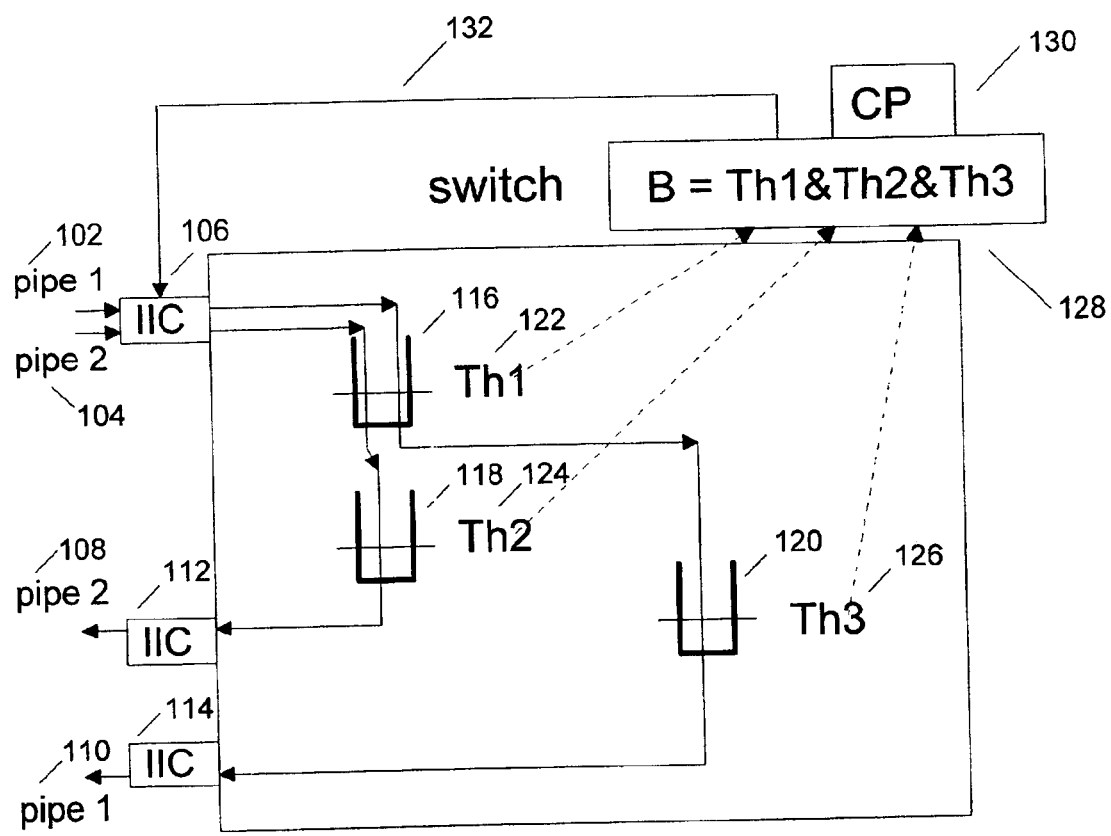
FIG. 7 shows how queue values might be included in the definition of excess bandwidth signal B for an example of two pipes passing through a IIC into a switch.

FIG. 7 shows the logical organization of reports of excess bandwidth signal B=0 or 1 to IICs. A plurality of pipes 102, 104 enter IIC 106 and the datagrams in the pipes are subject to flow control. The flow control depends in part on B signal 132 from the switch. The B signal might be generated in the Control Point (CP) 130 of the switch or, alternatively and more generally, the Flow Control Data organization block 308 of FIG. 14. The Control Point (or alternative) provides accumulation, storage, and logical combination (with ANDs or ORs or NOTs) of a plurality of threshold signals to generate and transmit periodically the excess bandwidth signal B.

Still referring to FIG. 7, the value of B might be a regular expression of a plurality of threshold signals Th1, Th2, . . . from within the switch. For example, the value of B could be the AND of a plurality of threshold signals. Each threshold signal Thi is 1 if the queue level of a storage resource 116, 118, 120 used by some pipe passing through the given IIC is below a threshold, respectively, 122, 124, 126. If the queue level is above the threshold, then the value of Thi might be 0. As shown, different pipes use different resources in a switch, in general. The same resources might be also used by other pipes (not shown) passing through other IICs (also not shown). Pipes then pass from the switch through additional IICs 112, 114 into links 108, 110 to other network nodes.

In another embodiment flow rates could be compared to threshold flow rates to generate one or more threshold signals. In yet another embodiment, combinations of unique thresholds and flow thresholds could be used.

Figure 8:
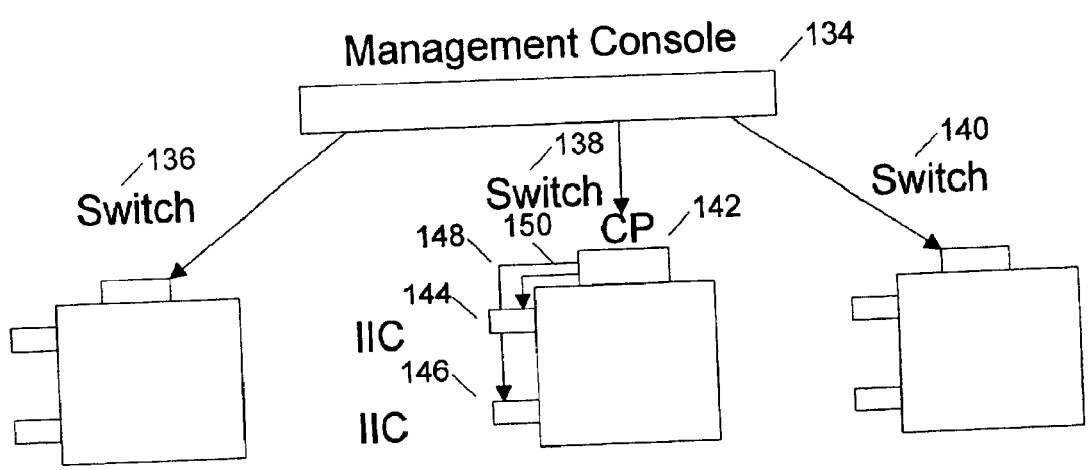
FIG. 8 shows details of network management initialization tasks.

FIG. 8 depicts the organization of a network to enable global QoS flow control. A Management Console 134 accumulates and distributes as needed information on what pipes with bandwidth guarantees use what resources with bandwidth capabilities. The information is communicated as needed to switches 136, 138, 140 in the network. A given switch such as 138 may have Control Point (CP) 142 that organizes information both from the Management Console and from congestion signals within the switch as shown in FIG. 7. The CP then passes both administrative information and congestion information through information channels 148, 150 into IICs, respectively 144, 146.

More particularly and with reference to FIG. 8, global QoS may be summarized as follows:
  Management Console
    Sorts and sends information on pipe paths, guarantees
  Switches in network each with Control Point (CP)
    Process pipe information to generate constants Ci, Di in BAT
  IICs in switches
    Accept and store pipe identification information
    Accept and store Ci, Di per pipe information
    Note that the preferred definitions of Ci and Di per pipe are given later in this section.

Figure 9:
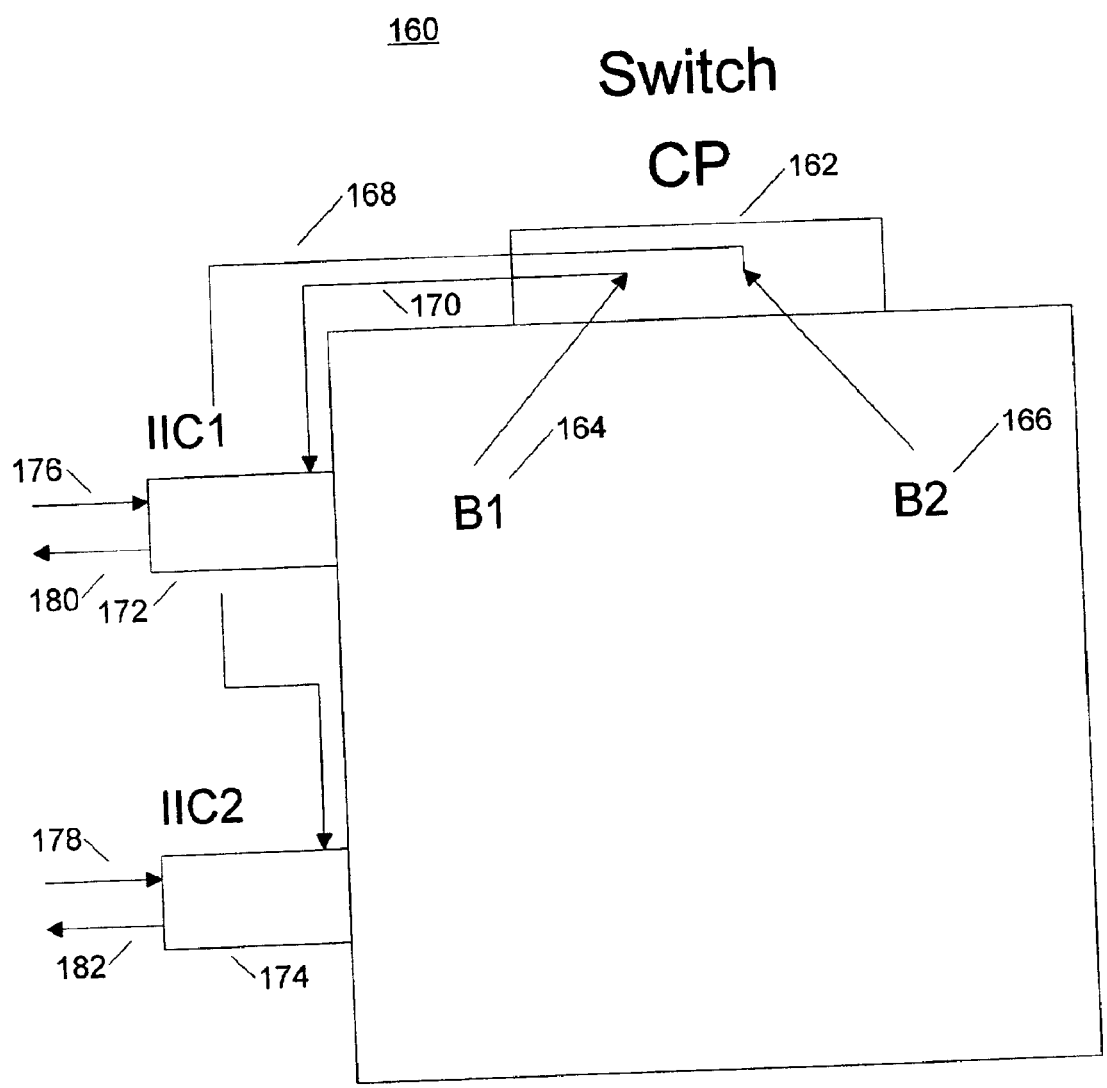
FIG. 9 shows an example of details of measurements of excess bandwidth signals B1, B2 by Control Point (CP). CP periodically reports B1 and B2 to the respective IIC1, IIC2 for use in bandwidth allocation for incoming traffic in the pipes in IIC1 and IIC2.

In further detail, FIG. 9 depicts the organization of signaling from congestion indications in a switch 160 to associated IICs IIC1 and IIC2 (172, 174). Different queue occupancy values or possibly flow rate values are compared within the switch to produce a plurality of excess bandwidth signals B1, B2, . . . , shown as items 164, 166. Each Bi is 0 if some resource used by some pipe in IIC number i is congested. Else, Bi is 1. The excess bandwidth signals are sent through communication channels 168, 170 to the appropriate IICs. The IICs then decide to transmit or discard arriving frames 176, 178. The IICs also enable departure of frames 180, 182. Signals B1 and B2 might share some common components.

Table 1 is a list of computational resources required by BAT in each IIC:

TABLE 1

Figure 10:
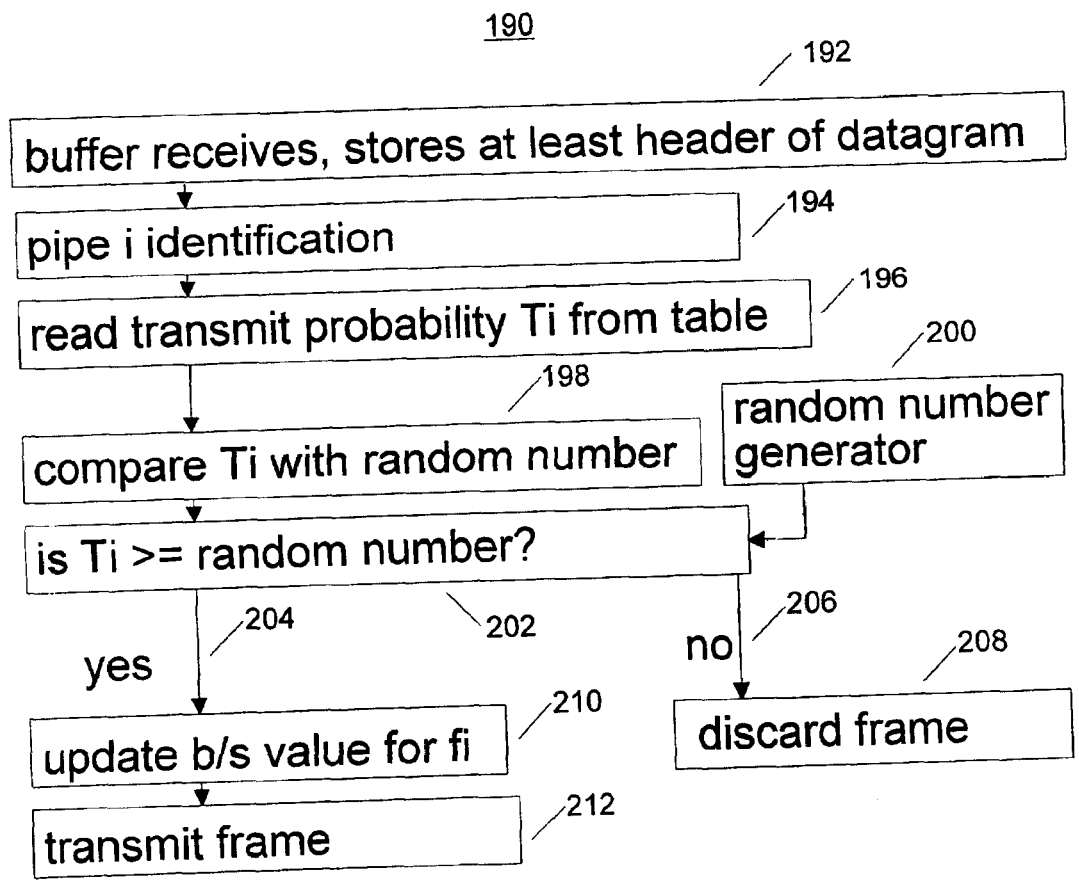
FIG. 10 shows details of the per frame transmit/discard decision and flow rate measurement and storage for a pipe in an IIC.

Computational Resources per IIC registers to store Ci, Di per pipe
register to receive and store current B from switch
mechanism to measure bits per second (b/s) transmitted flow fi per pipe
mechanism to update exponentially weighted average E of excess bandwidth signal B
register to store new E
register to store fi per pipe
register to store previous transmit fraction Ti per pipe
logic to determine new Ti per pipe
register to store new table of Ti values FIG. 10 shows a flowchart of the controller 190 in which the decision process for transmitting or discarding a frame in an implementation of BAT in an IIC. The process is initialized by the storage of at least the header frame in a buffer 192. From the header the pipe number is identified 194. This number is used to read a transmit probability 196 from a table (see FIG. 12). The transmit probability Ti has binary value in [0, 1] (so as bits Ti is some binary value with a fixed number X of bits in the range 00 . . . 0, through 11 . . . 1). Each transmit probability can be thought of as a fraction between 0 and 1, with 1 equivalent to $2^X-1$. A random number is generated 200 and it is regarded as having values just as is Ti. The value from the table is compared to the random number 198, 202. If outcome is yes 204, then go to block 210. If no 206, then go to block 208. In block 210, update the b/s value for pipe i. Then signal that the frame is to be transmitted 212. In block 208 signal that the frame is to be discarded.

FIG. 11 depicts the details of processes used in updating the values of transmit probabilities {Ti} of pipes.

FIG. 12 depicts the storage table format 220 of the values of transmit probabilities {Ti} of pipes. In particular, the pipe number 222 is an index into the table. The transmit probability fractions themselves (derived by an iteration of BAT flow control) are stored in adjacent memory slots 224.

The basic relationship for the periods of flow control updates and an excess bandwidth signal is the following. Each queue in the switch has a capacity C in bits. If a queue momentarily has no inputs and is draining at its maximum possible rate, then the queue can theoretically go from completely full to completely empty in C/(maximum drain rate) seconds. The updates of flow control and the reports B values from the switch to the IIC should have a period Dt that is equal to a constant K times this period. In a preferred embodiment, $K=\frac{1}{8}$.

$$Dt = K*(\text{queue capacity})/(\text{maximum drain rate})$$

The multiplicand value $K=\frac{1}{8}$ is, of course, a preferred value only and not strictly necessary for the practice of the invention. The value should certainly be less than ½ to avoid severe changes in queue occupancy before flow control can react. On the other hand, an excessively small value would cause unnecessary consumption of computational resources. One B value should be received during each flow control update interval Dt. Since the period of the standard maintenance interface in IICs is 10 us, this places a limit on use of the maintenance interface relative to switch queue capacities and flow rates.

A consequence of the above description of Dt is that all flow rates (minimum guaranteed rate, current pipe flow rate, and so on) are treated as fractions of 8*drain rate of the resource at which congestion occurs. Typically a switch has a storage buffer in an Ingress side (fed by a plurality of source ports) and a storage buffer in an Egress side (feeding plurality of target ports). The Ingress side storage must be protected from overflow due to classification delay in Ingress itself or due to polarization in the switch fabric it feeds. Polarization refers to the phenomenon of many Ingress pipes flowing into several switch fabric inputs and all flowing out one switch fabric output. Ingress congestion could also be caused by temporary suspension of sending packets to the switch fabric in response to congestion signals from one or more Egress sides.

For the purpose of BAT flow control protecting Ingress data stores, all flow rates are fractions of eight (again a nominal but consistent value) times the maximum possible drain rate of the Ingress data store. The drain rate is typically the rate at which data can be passed from Ingress to the switch fabric. Similarly, for the purpose of BAT flow control protecting Egress data stores, all flow rates are fractions of eight times the maximum possible drain rate of the Ingress data store. The drain rate is typically the rate at which data can be passed from Egress through a target port to a downstream network node. These same drain rates are the capacity rates used in the application of the Max-Min Algorithm defined later in this section.

In DiffServ, the path used by a Behavior Aggregate Flow (herein called simply a pipe) is set up with Resource Reservation Protocol (RSVP) described in IETF RFC Reference:

RFC 2750 RSVP Extensions for Policy Control. S. Herzog. January 2000. (Format: TXT=26379 bytes) (Updates RFC2205) (Status: PROPOSED STANDARD)

incorporated herein by reference.

The path is thought of as edge-to-edge, although the definition of an edge is flexible. In a preferred embodiment of the present invention it is presumed that pipes are established and that all traffic entering an IIC is organized according to DSCP values. Thus there is inherently the task of summing aggregations of flows with the same DSCP, and with that the risk of unfairness within an aggregation. However, with 14 standard DSCP values and up to 64 combinations of the 6 b theoretically possible, it would appear that strong QoS could be enforced at least for a limited number of pipes in a network.

Alternative embodiments might use the MPLS header to designate different pipes, including the 20-bit MPLS label and the three MPLS EXP bits. See Internet Draft "MPLS Label Stack Encoding," draft-ietf-mpls-label-encaps-07.txt. IETF Network Working Group, September 1999, E. Rosen, V. Rekhter, D. Tappan, D. Farinacci, G. Fedorkow, T. Li. A. Conta. The present invention includes examination of all header types according to various standards from which Quality of Service information can be conveniently and quickly extracted, all for the purpose of aggregating datagrams into a relatively small number of logical pipes passing through a switch or network.

Each pipe generally passes through many shared resources in a switch. Each pipe has an SLA with a minimum bandwidth value in bits per second (min) and a maximum bandwidth value (max). The offered load of a pipe might be less than its min, between its min and max, or in excess of its max. If the offered load is less than its min, then after at most a few adjustments of the transmit fraction, the frames in the pipe should be transmitted with probability 1. If the offered load of a pipe (at the IIC) is greater than the max of the pipe, then the transmitted fraction of the frames in the pipe should be reduced below 1 promptly (but not instantaneously) to reduce the pipe flow to the max value. If the offered rates of pipes in an IIC are between min and max values, then flow control should be used to calculate a transmit fraction for the pipe to approximate allocation it would get from the global Max-Min Algorithm.

Some pipes are in a class of service called Expedited Forwarding (EF) with min=max. Other pipes are called Assured Forwarding (AF) with 0<min<max. Still others are called Best Effort (BE) with 0=min<max. (See RFC 2474, cited above.)

Weak QoS gives qualitative, relative relationships among "colors" in a class, but the emphasis in the present invention is on strong, quantitative performance guarantees, primarily in the context of min and max values. DiffServ also concerns latency and jitter performance, but well designed flow control such as BAT will cause queue occupancy in general to be much lower than occupancies with conventional, intuitive flow controls, thus avoiding latency and jitter performance problems simply by routinely running queues at low values.

The task of the administrator is to note the paths of all pipes and to assign to every DSCP pipe that might appear in a IIC a min and a max value. The value of each pipe's min must be limited by the requirement that if all pipes in the network are sending at their min rates, then all SLAs will be met. The max value of each pipe's max must be limited by the requirement that its SLA is met if that pipe is sending traffic at is max rate while all other pipes send at zero rate. In recommended practice, max rates are not inordinately greater than min rates, especially for traffic types that are not responsive to drops, for example, User Datagram Protocol (UDP) traffic.

The Max-Min Algorithm is a definition of fair bandwidth allocation when some pipes are AF or BE. It can be applied when the offered loads of some pipes combine somewhere in a switch (or network) to exceed network resources.

The following paragraph describes network-level (global) Max-Min allocation. A more detailed description is set forth in D. Bertsekas and R. Gallager, "Data Networks," Prentice Hall, Englewood Cliffs N.J., 1992, and is incorporated herein by reference for background information, only. The Max-Min Algorithm first allocates to each pipe with index i its minimum, designated mini. The Max-Min Algorithm teaches that we compare mini with the offered load of pipe i and allocate tentatively the minimum of those numbers to pipe i. If the minimum is already the offered load, then pipe i is declared "sated" and is removed from the set of pipes to be allocated bandwidth. Else pipe i remains in the set of pipes contending for excess bandwidth. For each remaining pipe i and each resource shared by that pipe, we find the current excess bandwidth (must be >=0, else contracts are invalid). If the minimum of all such excess bandwidths per resource for pipe i is positive, then Max-Min divides that minimum excess bandwidth at that bottleneck resource by the number of unsated pipes using it. That fraction is then allocated to each pipe i, added to its previous allocation. Then offered loads are again compared to current allocation and the minimum is again found. If the offered load is the minimum, then pipe i is declared sated; else, pipe i remains unsated. If there are any remaining unsated pipes and any has still positive excess bandwidth, then excess bandwidth is again sought and divided, and so on.

Suppose pipe i has current flow between min and max. Pipe i enters the switch through a given IIC, along with other pipes. If the current B value for the IIC is 1, then the transmit fraction Ti of each pipe in the IIC (if not already 1) is allowed to increase linearly. The coefficient Ci of the linear rate of increase for the transmit fraction Ti used by IIC is defined as follows. If all pipes offer their maximum loads, then the Max-Min Algorithm yields a bandwidth allocation Pi bits per second for each pipe. As stated above, this rate is expressed at each resource (site of Ingress or Egress BAT flow control) as a fraction of eight times the maximum drain rate of that resource. The definition of Ci is Ci used for pipe i in flow control at a resource=(Pi as a fraction of (8*drain rate of the resource))*1/16

The multiplier 1/16 is not critical. For example, 1/32 will also work. The reason is given below, following the definition of Di.

BAT also calls for use of the flow rate fi of pipe i in bits per second. Each fi is again measured for the purpose of local flow control as a fraction of eight times the local resource drain rate. At each IIC during epochs of B=0, the exponential decrease of Ti is at the rate −Di*fi, for a constant Di to be defined below.

Let the minimum guaranteed bandwidth of pipe i for the purpose of local flow control be given as mini=that bandwidth again measured for the purpose of local flow control as a fraction of eight times the local resource drain rate.

If every pipe except pipe i offers zero bandwidth and pipe i offers its maximum bandwidth, then the Max-Min Algorithm yields an allocation to pipe i of bandwidth Qi bits per second. Again, all pipe flow rates are expressed at each resource (site of Ingress or Egress BAT flow control) as fractions of eight times the maximum drain rate of that resource. The definition of Di is Di=((Qi−mini) expressed as a fraction of (8*drain rate of the resource))*4

The multiplier 4 here is not precise (for example, 2 will also work). The reason is as follows. Suppose all pipes in a IIC are greedy in that the offered rate for each pipe i is its maximum rate. So long as exponential decrease is prompt compared to linear increase, the flow over time for pipe i (maximum * area under the Ti curve) will still be in fixed proportion to Ci. Since Ci is already the result of Max-Min, the allocation approximates the Global Max-Min Allocation. These are the values of Ci, Di that should be sent by an administrator to the IICs.

Logical Inputs and Outputs

The context of this section is shown in FIGS. 9, 10, 11, 12, 13, 14.

To update the transmit probabilities per pipe, each IIC requires certain values.

Inputs
Constants

Ci and Di per pipe

Input from IIC Measurements the transmitted flow rate fi in bits per second for each pipe in the IIC Input from Switch composite excess bandwidth signal B defined from congestion status of all switch resources used by all the pipes in the IIC aggregate of signals from multiple output blades with N different B values into a TDM signal $B_N$ made available to some set of pipes Stored Values from Previous Iteration Previous transmit probability Ti for each pipe Previous exponentially weighted average E of B values Outputs Stored in IIC for Future Iteration Current transmit probability for each pipe Ti Current value E of exponentially weighted average of B values Sent to Hardware for use in Filling Transmit Probability Table Ti for each pipe i The constants Ci and Di were defined in the previous section.

The value of B can be derived as follows. All the pipes entering the switch through the IIC utilize different switch resources. If none of the switch resources used by any of the pipes in the IIC is currently congested to the extent that congestion causes drops, unacceptable latency, or unacceptable jitter, then B is 1. Else B is 0. Note that the same switch resources might be used by other pipes that do not enter the switch through the given IIC. Congestion might be caused strictly by the pipes that pass through the given IIC, strictly by pipes that do not pass through the given IIC, or any combination. Keeping track of which pipes use which resources is an administrative task to be completed before initialization.

In a preferred embodiment, the value of Ti is updated from values of {Ti, B, E, fi} at time t to values at time t+Dt as follows:

If fi<=mini, then Ti(t+Dt)=min {1, Ti(t)+0.125}

Elseif fi>maxi, then Ti(t+Dt)=0.875*Ti(t)

Elseif B=1, then Ti(t+Dt)=min {1, Ti(t)+Ci*E(t)}

Else Ti(t+Dt)=max {0, Ti(t)−Di*fi(t)}

Other embodiments might use related methods with linear increase of Ti when B=1 and exponential decrease of Ti when B=0.

It should be noted that the structures in the figures are only examples of implementing the circuitry in the IIC and this showing should not be construed as a limitation on the scope of the invention. In particular, the very same invention could be practiced in the logically analogous context of a PHY, a MAC (Ethernet), a Framer (Packet over Sonet), or other Input Interface Circuit (IIC).

The present invention is most advantageously deployed in conjunction with flow control algorithms that use control theory to enforce flow control, such as Bandwidth Allocation Technology (BAT). BAT uses ordinary performance criteria (minimum guaranteed bandwidth and maximum limit on bandwidth), not abstract thresholds as in RED or WRED. BAT declares 100% transmission for pipes that are at or below their minimum bandwidth guarantees. BAT fairly allocates bandwidth among pipes with offered loads above their guaranteed minimums. Also, BAT may run queue (Queue and pipe are used interchangeably in this document) occupancy routinely at low levels, in contrast to RED or WRED mechanism that, to work at all, must run queue occupancy somewhere between various low and high thresholds.

A benefit that distinguishes the present invention from prior art is that datagrams that are of such low value and part of high oversubscription of switch processing resources are dropped before entering the switch. The conventional flow control approach may often see datagrams that enter a switch, are processed and routed within the switch consuming computational resources, and then dropped before leaving the switch. This benefit can translate into enhancing switch speeds and efficiencies with a given hardware, enabling the same switch functions with reduced hardware resources, or a combination of these two benefits.

Another benefit that distinguishes the present invention from prior art is the fact that the present invention could be easily retrofitted onto some existing switches just by replacing its IICs. Coupling such IICs to network management resources would be a low cost and simple way to implement QoS.

Figure 13:
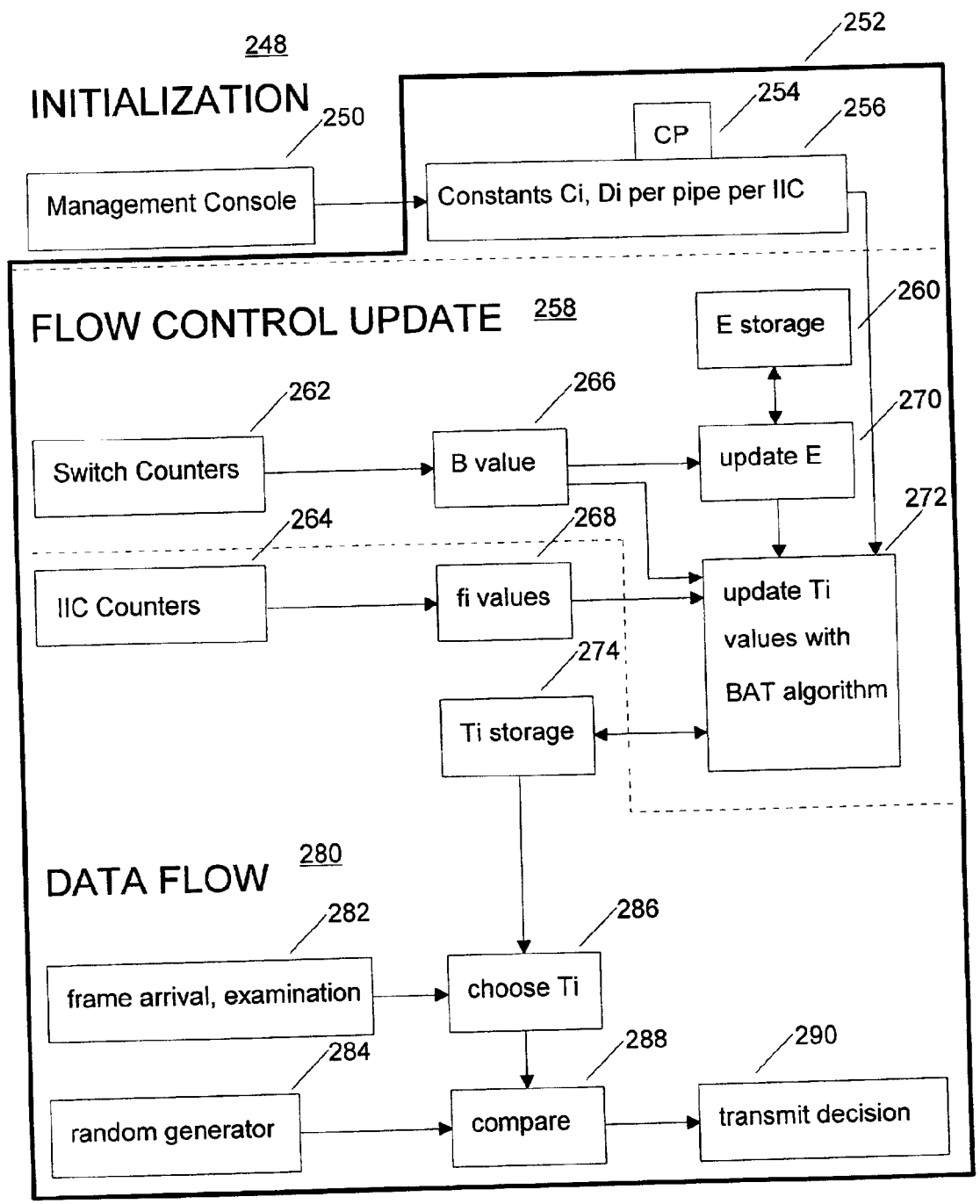
FIG. 13 is an overview of logical tasks in BAT+IIC. Three update speeds partition the tasks. The heavy line shows the logical boundary of the present invention.

FIG. 13 shows a logical representation of the present invention. The present invention enables proactive flow control in the logical path upstream of a switch. Initialization 248 is enabled in a Management Console 250. The Management Console communicates information on pipes and their SLAs to network nodes. The logic in a Input Interface Circuit (IIC) in such a node is delimited by the heavy line 252. The constants from the management console are kept and processed (such as normalized relative to switch physical parameters) in the Control Paint (CP) 254. Each IIC 252 stores the appropriate constants pertaining to the logical pipes that pass through it. These processes are typically at relatively low data rates and the upper dashed line in FIG. 13 delineates these processes. Below the same line are flow control update processes 258. The exponentially weighted average E of excess bandwidth signals is stored 260. As previously described in FIGS. 7, 8, 9, switch queue occupancy counters 262 report values to the control point that in turn are communicated as an excess bandwidth signal B 266. B is used to update E 270. B is also used, with E, to update the transmit probability fractions for the pipes in the IIC. ICC counters 264 record flow rates in pipes. Transmitted flow rates {fl} for pipes 268 are also accumulated. Transmit probability fractions {Ti} are stored 274. The values of E, B, {fl}, and {Ti} are used by BAT flow control algorithm 272 to calculate new transmit probability fractions. In a preferred embodiment, logic for updating the flow control transmission fractions might reside in the IIC. (In an alternative embodiment, logic for updating the flow control transmission fractions might reside in the Flow Control Data organization block depicted in FIG. 14.) The lower dashed line in FIG. 13 delimits these processes. Below that line are data flow processes 280. Frames arrive and are examined for identity 282. Concurrently random numbers are generated 284. As a frame arrives, its identity is used to select a transmit probability Ti 286 from the {Ti} storage table. Then Ti and the random number are compared 288. If the transmit probability is greater than or equal to the random number, then the transmit decision 290 is: transmit. Else the transmit decision is: discard.

Figure 14:
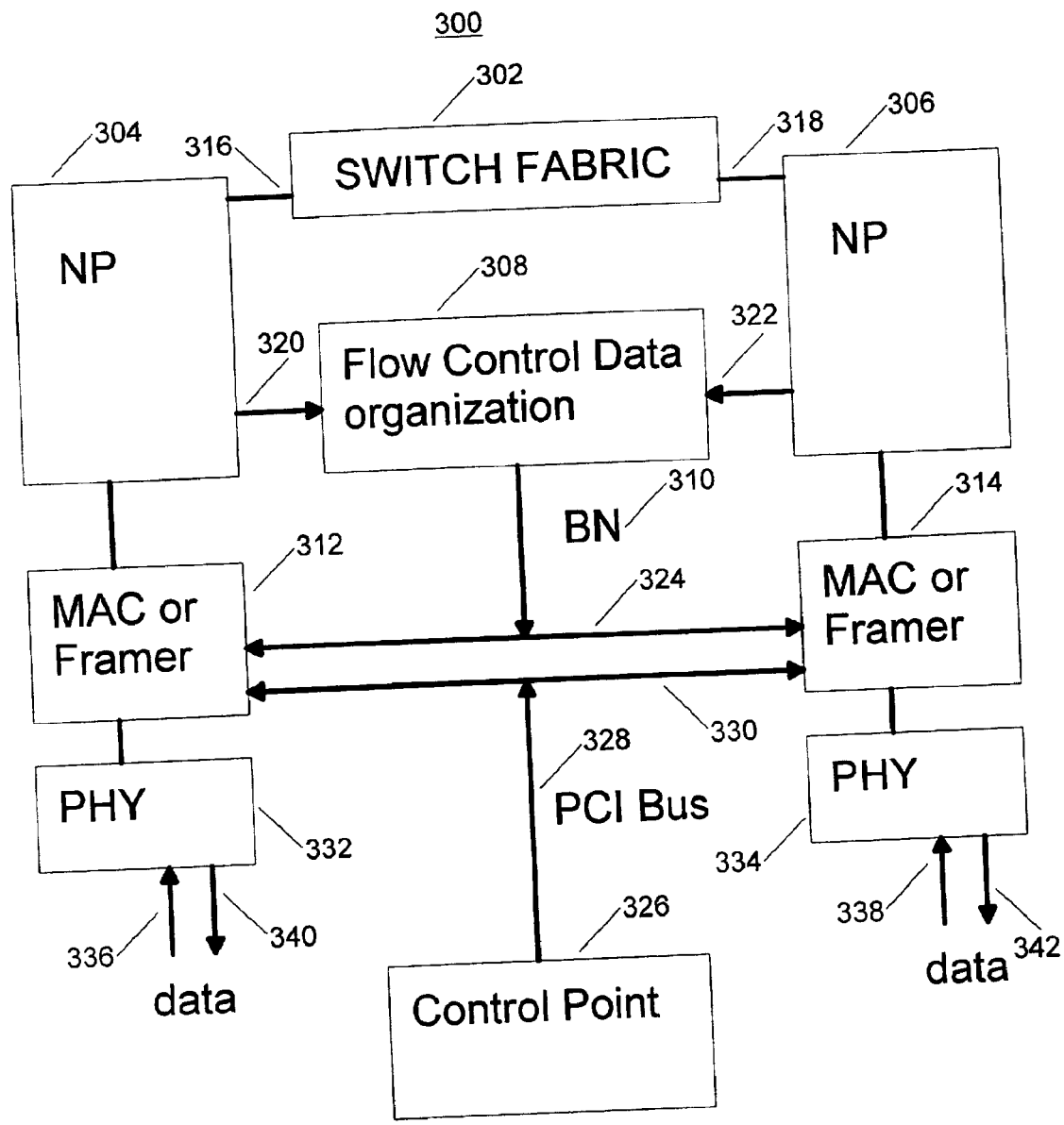
FIG. 14 shows overall layout of resources in a switch.

An overview of the implementation of the present invention in a switch is shown in FIG. 14. Datagrams for the switch 300 arrive in links 336, 338. PHYs 332, 334 convert between photonic data in links and internal electronic signals. Data then pass into MAC or Framer components 312, 314. The MAC or Framer components communicate with the Control Point 326 by means of a Peripheral Connection Interface (PCI) Bus 328 and associated wires 330. MAC or Framer components also receive on wires 324 from Flow Control Data organization excess bandwidth signals BN 310. Data passing through a plurality of Network Processors 304, 306 generates queue occupancy conditions that are reported by wires 320, 322 to Flow Control Data organization 308. Data pass among Network Processors through a matrix of connections, the Switch Fabric 302.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teaching and advanced use of this invention. Accordingly, all such modifications are intended to be included within the scope of this invention as defined in the claims.

What is claimed is:

1. A method for making transmit/discard decisions on individual datagrams including the steps of:
   a) determining pipe membership of said datagrams by testing certain bits in said datagram within each Input Interface Circuit of a network node upstream of the packet forwarding device, the selection of bits made on the basis of standards for constructions of datagrams with one or more of levels of headers and payloads;
   b) providing a table of values indicating transmit probability for each pipe of a predetermined set within each said Input Interface Circuit;
   c) selecting a corresponding value matching said pipe membership of said datagram from said table; and
   d) selectively transmitting or discarding said datagrams responsive to said transmit probability matching said pipe membership.

2. The method according to claim 1, wherein the step of selectively transmitting further includes the steps of:
   e) providing a random number generator in the Input Interface Circuit;
   f) performing a comparison of a current state of said random number generator with the value of transmit probability taken from said table of values;
   g) discarding said datagram if the current state of said random number generator is closer than said value of transmit probability to a value representing a state where all datagrams of a pipe are to be transmitted; and
   h) transmitting said datagram if the current state of said random number generator is not closer than said value of transmit probability to a value representing a state where all datagrams of a pipe are to be transmitted.

3. The method according to claim 2, wherein said value representing a state where all datagrams of a pipe are to be transmitted is equal to one and said current state of said random number generator is a nonnegative fraction between 0 and 1.0.

4. The method according to claim 1, wherein the step of pipe membership determination further includes the steps of comparing administratively specified values with the value of selected fields in a packet header of said datagrams.

5. The method according to claim 4, wherein said selected fields of a packet header comprises the Differentiated Services Code Point (DSCP) field in a standard IP packet header.

6. The method according to claim 4, wherein said selected fields of a packet header comprises the MPLS (Multiprotocol Label Switching) label or EXP bits or any combination thereof, within the datagram, or ATM VPI/VCI fields also used for MPLS tunnel designation.

7. The method according claim 1, wherein said table of value is indexed according to pipe numbers with each corresponding table entry representing the transmit probability corresponding to the associated pipe.

8. The method according to claim 1, further comprising the step of altering said values indicating transmit probability responsive to actual offered data rates in each of said pipes relative to guaranteed minimum and/or maximum data rates of those pipes.

9. The method according to claim 8, wherein the step of altering said values is further responsive to a signal from said packet forwarding device indicating congestion within that device that affects one or more pipes flowing through said Input Interface Circuit.

10. The method according to claim 9, wherein said signal includes multiple components each of which corresponds to congestion within a different output port or group of output ports, said pipes within said Input Interface Circuit are grouped according to which output port or group of output ports they direct data to, and wherein the step of altering said values is performed separately for each group of pipes.

11. An apparatus in an Input Interface Circuit of a packet forwarding device comprising:
   a) a table in which pipe numbers and associated probabilities of transmission are stored;
   b) a buffer for storing at least a portion of a frame;
   c) a random number generator that periodically outputs random numbers;
   d) a controller operatively coupled to the table, the buffer and random number generator, said controller;
      parsing the information in the buffer to detect a pipe membership number for said frame,
      determining from said table a transmission (transmit fraction) probability value corresponding to the detected pipe membership number,
      comparing the probability value with a present value of the random number generator and discarding or forwarding the frame based upon the result of the comparison.

12. The apparatus according to claim 11, wherein said controller alters said values indicating transmit probability responsive to algorithm constants and actual offered data rates in each of said pipes relative to guaranteed minimum and/or maximum data rates of those pipes.

13. The apparatus according to claim 12, further comprising a management component, said management component initializing said algorithm constants and said guaranteed minimum and maximum data rates of pipes.

14. The apparatus according to claim 11, further comprising an interface to an external controller not contained within said Input Interface Circuit, said external controller being connected to one or more input Interface Circuit and altering said values indicating transmit probability responsive to algorithm constants and actual offered data rates in each of said pipes relative to guaranteed minimum and maximum data rates of those pipes within each of the Input interface circuit it is connected to.

15. The apparatus according to claim 14, further comprising a management component, said management component initializing said algorithm constants and said guaranteed minimum and maximum data rates of pipes.

16. The apparatus according to claim 12, wherein said controller is further responsive to a signal from said packet forwarding device indicating congestion within that device that affects one or more pipes flowing through said Input Interface Circuit in altering said values.

17. The apparatus according to claim 14, wherein said external controller is further responsive to a signal from said packet forwarding device indicating congestion within that device that affects one or more pipes flowing through said Input Interface Circuit in altering said values.

18. The apparatus according to claims 16 or 17, wherein said signal includes multiple components each of which corresponds to congestion within a different output port or group of output parts, said pipes within said Input Interface Circuit being grouped according to which output port or group of output ports they direct data to, and wherein the altering of said values is performed separately for each group of pipes.

19. A method that controls the flow of datagrams including the steps of:
   a) providing, in an Input Interface Circuit of a network node, a table identifying pipes and associated transmission probability for each pipe in said table;
   b) for each datagram received in said Input Interface Circuit determining the identity of said datagram by examining bits within said datagram;
   c) correlating datagram identity in step (b) with entries in the table; and
   d) discarding or forwarding a datagram based upon the value of the transmission probability only if the datagram identified in step (b) matches the identity of a pipe in the table.

20. The method of claim 19, wherein numerals are used to indicate the identity of pipes and the identity of datagrams.

21. The method of claim 20, further including the steps of providing a random number generated; and
   discarding or forwarding a datagram based upon the value of the transmission probability and a present value of the random number generator.

22. A communication system comprising:
   a switch;
   a congestion monitoring device operatively coupled to said switch, said congestion monitoring device monitoring transmission in said switch and generating at least one signal indicating congestion state in said switch;
   a Physical Device (PHY) operatively coupled to the switch, said PHY receiving and forwarding frames to said switch; and
   a frame discard mechanism, located in said PHY, responsive to the at least one signal to discard frames based upon transmit probability for queues to which said frame is associated.

23. A method to manage congestion in a communications network comprising the acts of:
   operatively monitoring, with a congestion device, traffic within a communications device;
   generating at least one signal indicating congestion state in said communications device; and
   activating a discard mechanism with the at least one signal to discard frames based upon transmit probability for queues to which said frames are associated and prior to initiating processing on the discarded frames, or forward frames to the communications device for processing.

24. A method for managing congestion within a communications network comprising:
   examining at least one packet to determine identity of at least one queue to which said packet is being affiliated;
   obtaining a transmit probability for the at least one queue based upon the identity so determined;
   generating variable parameters with a generator;
   comparing the transmit probability with a selected one of said variable parameters; and
   discarding a packet with a discard mechanism based upon a predefined result of said comparison.

25. The method of claim 24 wherein obtaining transmit probability includes providing a table including queues paired with transmit probabilities; and
   indexing into the table with identity of the at least one queue to select the transmit probability.

26. The method of claims 24 wherein the variable parameters include random numbers from a random number generator.

27. The method of claim 26 wherein the predefined result includes the transmit probability <=to a selected one of the random numbers.

28. A method for managing congestion within a communications network comprising:
   examining at least one packet to determine identity of at least one queue to which said packet is being affiliated;
   obtaining a transmit probability for the at least one queue based upon the identity so determined;
   generating variable parameters with a generator;
   comparing the transmit probability with a selected one of said variable parameters; and
   forwarding the at least one packet based upon a predefined result of said comparison.

29. The method of claim 28 wherein the predefined result includes the transmit probability >=to a selected one of the variable parameters.

* * * * *